UNITED STATES PATENT OFFICE.

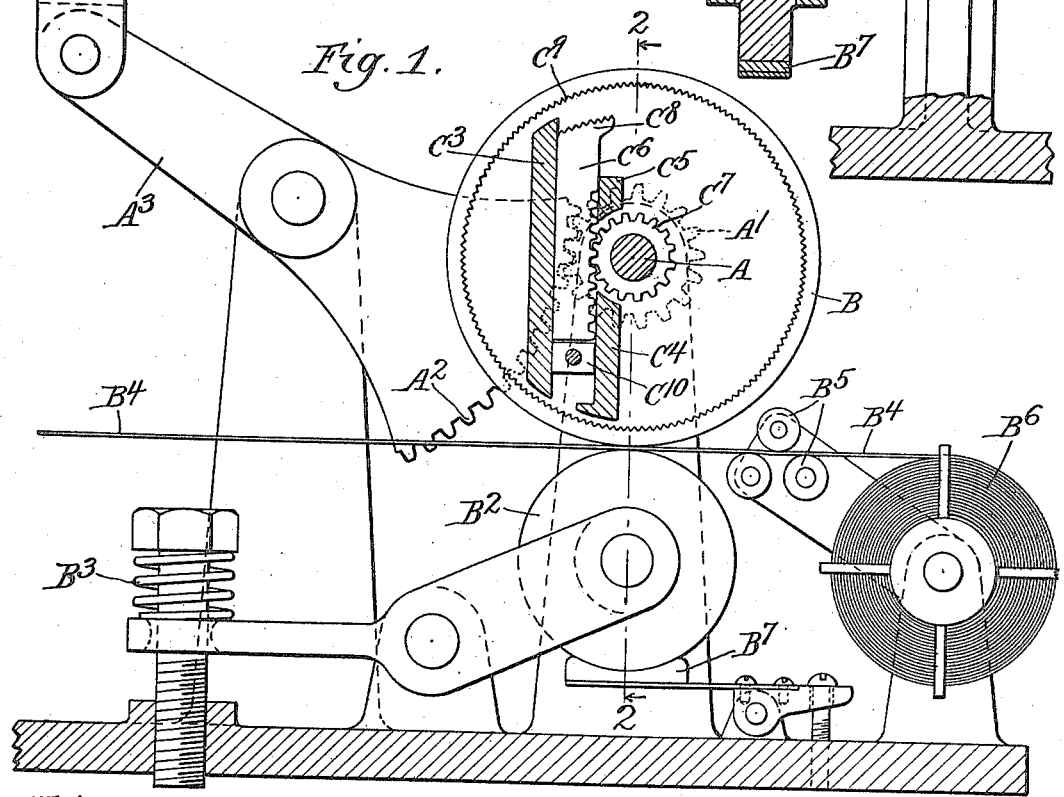

GUNNAR E. EHRLING, OF CHICAGO, ILLINOIS, ASSIGNOR TO BATES VALVE BAG COMPANY, OF CHICAGO, ILLINOIS, A CORPORATION OF WEST VIRGINIA.

INTERMITTENT OPERATING MECHANISM FOR WIRE-MACHINES.

1,233,457.     Specification of Letters Patent.      Patented July 17, 1917.

Application filed August 14, 1915. Serial No. 45,480.

*To all whom it may concern:*

Be it known that I, GUNNAR EMANUEL EHRLING, a citizen of the United States, residing at Chicago, in the county of Cook and State of Illinois, have invented a certain new and useful Improvement in Intermittent Operating Mechanism for Wire-Machines, of which the following is a specification.

My invention relates to improvements in intermittent operative mechanism for wire machines, particularly adapted for use in connection with machines for feeding wire, and some of the objects of my invention are to obtain a connection accurate and noiseless engagement and disengagement of the driving with the driven part. I have shown the clutch in connection with a wire feeding device.

Figure 1 is an end elevation of a wire feeder showing parts in section.

Fig. 2 is a section at the line 2—2 of Fig. 1.

Fig. 3 is a detail on an enlarged scale of the clutch teeth.

Fig. 4 is a detail on an enlarged scale in section showing a modified form wherein a friction drive is used instead of the clutch teeth.

Like parts are indicated by similar letters in all the figures.

A is the drive shaft. It carries on one end a pinion $A^1$ in mesh with the segment end $A^2$ on the rock lever $A^3$. $A^4$ is a driving link adapted to reciprocate the rock lever $A^3$ through a predetermined angle of movement. $A^5$ $A^6$ are bearings in which the shaft A is mounted for rotation.

B is a feed drive roll mounted for rotation on the shaft A, being supported thereon by a hub $B^1$. $B^2$ is an anvil drive roll mounted in opposition to the feed roll B, being pressed yieldingly thereagainst by a spring $B^3$. $B^4$ is a wire adapted to be fed between the two rolls, $B^5$ a wire straightener through which the wire is drawn, and $B^6$ a wire supply reel. $B^7$ is a friction brake adapted yieldingly to resist the rotary movement of the roll $B^2$ and the roll B.

C is a driving wheel mounted for rotation on the shaft A and held frictionally against rotation with respect to the roll B and the shaft A by means of the nut $C^1$ and lock nut $C^2$. $C^3$, $C^4$, $C^5$ are guide ways on the driving wheel C. In them is mounted free to slide a rack $C^6$. This rack is in mesh with a gear $C^7$ on the shaft A. $C^8$ is a serrated or toothed drive foot on the end of the rack $C^6$ in opposition to teeth $C^9$ on the inner periphery of the roll B. $C^{10}$ is an adjustable stop block mounted in the path of the rack $C^6$ to adjustably limit its return movement.

In Fig. 4 in a modified form F is a contact wedge on the end of the rack $C^6$ adapted to engage a V-shaped groove $F^1$, the wedge and groove being in this case substituted for the serrations on the presser foot and feed roll.

It will be evident that while I have shown in my drawings an operative device, still many changes might be made in size, shape and arrangement of parts without departing from the spirit of my invention.

The use and operation of my invention as applied in connection with a wire feeding mechanism are as follows:

The wire having been first introduced between the two rolls by any suitable means or operation not here necessarily indicated, the reciprocating drive member is started causing the lever or rack arm to reciprocate. Since the segment on the end of this arm is in mesh with the gear on the shaft, the shaft will rock back and forth through an angle of any suitable size, say, for instance 225°. As the shaft commences its rotation in a clockwise direction, it causes the rack to be first thrust forward into mesh with the driving roll. When the rack foot rests firmly against the driving roll, no further movement of the rack with respect to its guide wheel is possible, and as the driving shaft still rotates the driving wheel and the driving roll will all rotate as a unit with the shaft until the shaft reaches the end of its excursion. When the shaft commences its reverse movement, it tends instantly to draw the rack away from its previous position, thus instantly freeing the presser or driving foot from mesh with the drive roll. The rack is thus carried back until it strikes against the stop whereupon since no further independent movement of the rack is possible, the shaft carries the rack and the driving plate back to the first position, but since the rack is completely disengaged from the driving roll, the driving roll does not travel back.

It will be noted that there is a certain amount of friction resisting the movement of these parts. The result of this is that there can be no rotary movement of the serrated driving foot on the rack with respect to the teeth on the roll, and thus no wear can take place, the idea being that the movement of the serrated presser foot is always directly toward or away from the roll, and never along the roll. Thus the mechanism is always absolutely quiet.

Under ordinary circumstances the angle through which the shaft oscillates is always fixed. The angle through which the roll is moved forward by each forward oscillation of the shaft would thus be fixed also, unless means were provided for varying the response of the roll to the oscillation of the shaft. This is done by the adjustable stop block. If the block is moved back its full distance, then the shaft will make an appreciable retrograde movement before the return movement of the driving member takes place, and the driving member will then not get so far back. From a forward movement it will then make a short stroke. If, however, the stop block is moved up so that the instant the teeth are clear the return commences, then the driving member will go back a complete stroke, and on its return will travel through the same long distance, thus increasing the drive length. By a close adjustment of the position of this stop, an exceedingly accurate drive may be obtained.

The teeth which take the drive are of course rather fine, so that the parts when they are in mesh, will always be closely accurate, but if even greater accuracy is desired, these teeth could be dispensed with and the friction teeth engage the V slot as indicated. In this case no displacement owing to variation in engagement of the teeth would take place and the drive would be absolutely accurate. In the proportions shown the parts are arranged to give a drive or feed of 6¼ inches of wire, and with the teeth in operation, I find that the device can be set to operate with a tolerance of not greater than 1/64th of an inch. If closer adjustment were necessary, however, the friction drive would be used, but for ordinary purposes where the device draws the wire through a straightener and off a heavy reel, I find that a positive drive is desirable.

I claim:

1. A clutch comprising a shaft, a driving and a driven member rotatably mounted and a gear rigidly mounted thereon, a flange carried by the driven member, a rack in mesh with the gear and mounted for reciprocation on the driving member, the end of the rack being adapted to engage the flange.

2. A clutch comprising a shaft and means for oscillating it, a driving and a driven member rotatably mounted and a gear rigidly mounted thereon, a flange carried by the driven member, a rack in mesh with the gear and mounted for reciprocation on the driving member, the end of the rack being adapted to engage the flange, and means for limiting the movement of the rack in the reverse direction.

3. A clutch comprising a shaft and means for oscillating it, a driving and a driven member rotatably mounted and a gear rigidly mounted thereon, a flange carried by the driven member, a rack in mesh with the gear and having a contact foot adapted to engage the flange and mounted for reciprocation on the driving member, adjustable means for limiting the movement of the rack in the reverse direction and a contact member carried by the rack and adapted to engage the flange.

4. A clutch comprising a shaft, a driving and a driven member rotatably mounted and a gear rigidly mounted thereon, a flange carried by the driven member, a rack in mesh with the gear and mounted for reciprocation on the driving member, the rack being serrated at its end and adapted to engage the flange.

5. A clutch comprising a shaft and means for oscillating it, a driving and a driven member rotatably mounted and a gear rigidly mounted thereon, a flange carried by the driven member, a rack in mesh with the gear and mounted for reciprocation on the driving member, means for limiting the movement of the rack in the reverse direction, the rack serrated at its end and adapted to engage the flange.

6. A clutch comprising a driving shaft, a driven member and a driving member rotatably mounted thereon, a clutch member slidable on the driving member and means responsive to a relative movement of the shaft and driving member for thrusting said clutch member into engagement with the driven member.

7. A clutch comprising a driving shaft, a driven member and a driving member rotatably mounted thereon, a clutch member slidable on the driving member and means responsive to a relative movement of the shaft and driving member for thrusting said clutch member into engagement with the driven member, the clutch member being inclined to a radius drawn from the shaft to the point of contact of the clutch member and the driven member.

8. A clutch comprising a driving shaft, a driven member and a driving member rotatably mounted thereon, a clutch member slidable on the driving member and means responsive to a relative movement of the shaft and driving member for thrusting said clutch member into engagement with the driven member, the driven member and the clutch member being serrated in opposition one to another to take the drive.

9. A clutch comprising a driving shaft and means for oscillating it, a driven member and a driving member rotatably mounted thereon, a clutch member slidable on the driving member and means responsive to a relative movement of the shaft and driving member for thrusting said clutch member toward and from the driven member, and means for limiting a retrograde movement of the clutch member.

10. A clutch comprising a driving shaft and means for oscillating it, a driven member and a driving member rotatably mounted thereon, a clutch member slidable on the driving member and means responsive to a relative movement of the shaft and driving member for thrusting said clutch member toward and from the driven member, and adjustable means for limiting a retrograde movement of the clutch member.

11. A clutch comprising a rotary driving and a rotary driven member mounted for rotation about a common axis, a clutch member movable on the driving member toward and from the driven member, a power source, a connection therefrom to the movable clutch member, a means responsive to the operation of such connection for thrusting the movable member into engagement with the driven member to lock all the members together for rotation responsive to the power connection.

12. Means for translating an oscillatory movement into an intermittent forward movement comprising an oscillating driving member, a driven member, a rotary driving member, a locking member mounted on the rotary driving member free to move toward and from the driven member, a direct connection between the locking member and the oscilating member, and a direct connection between the oscillating member and the driving member.

In testimony whereof, I affix my signature in the presence of two witnesses this fifth (5th) day of August, 1915.

GUNNAR E. EHRLING.

Witnesses:
EDWARD WM. MERCKE,
CHAS. R. POMEROY.